(12) United States Patent
Jaques et al.

(10) Patent No.: US 6,810,407 B1
(45) Date of Patent: Oct. 26, 2004

(54) OPTICAL BOOLEAN LOGIC DEVICES FOR DATA ENCRYPTION

(75) Inventors: James J Jaques, Metuchen, NJ (US); Herman Melvin Presby, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 09/616,107

(22) Filed: Jul. 14, 2000

(51) Int. Cl.[7] .................................................. G06G 7/00
(52) U.S. Cl. ........................................................ 708/801
(58) Field of Search ......................................... 708/801

(56) References Cited

U.S. PATENT DOCUMENTS

| | | | |
|---|---|---|---|
| 3,984,785 A | 10/1976 | Riseberg et al. | 331/94.5 |
| 4,262,992 A | 4/1981 | Berthold | 350/96.14 |
| 4,632,518 A | 12/1986 | Jensen | 350/385 |
| 4,932,739 A | 6/1990 | Islam | 350/96.15 |
| 4,962,987 A | 10/1990 | Doran | 350/96.15 |
| 5,208,705 A | 5/1993 | Avamopoulos et al. | 359/173 |
| 5,353,114 A * | 10/1994 | Hansen | 356/477 |
| 5,557,699 A | 9/1996 | Kester et al. | 385/122 |
| 5,623,359 A | 4/1997 | Giles et al. | 359/180 |
| 5,694,444 A | 12/1997 | Bagchi et al. | 377/54 |
| 5,696,828 A | 12/1997 | Koopman, Jr. | 380/46 |
| 5,739,933 A | 4/1998 | Dembeck et al. | 359/117 |
| 5,822,103 A * | 10/1998 | Boroson | 398/189 |
| 5,864,625 A | 1/1999 | Rutledge | 380/31 |
| 5,900,956 A | 5/1999 | Cotter | 359/139 |
| 5,917,638 A | 6/1999 | Franck et al. | 359/181 |
| 5,953,421 A | 9/1999 | Townsend | 380/21 |
| 5,966,444 A | 10/1999 | Yuan et al. | 380/21 |
| 5,999,293 A | 12/1999 | Manning | 359/139 |
| 6,005,943 A | 12/1999 | Cohen et al. | 380/30 |
| 6,388,753 B1 * | 5/2002 | Hall et al. | 356/450 |
| 6,634,813 B2 * | 10/2003 | Hall et al. | 398/213 |
| 2001/0055439 A1 * | 12/2001 | Song | 385/15 |

FOREIGN PATENT DOCUMENTS

| | | | |
|---|---|---|---|
| EP | 0866581 A2 | 9/1998 | H04L/0/08 |
| EP | 2335 102 A | 9/1999 | G02F/3/00 |
| WO | WO 96/18964 | 6/1996 | G06G/7/00 |

OTHER PUBLICATIONS

J. Leuhold, "All–Optical Mach–Zehnder Interferometer Wavelength Converters and Switches with Integrated Data– and Control–Signal Separation Scheme", *Journal of Lightwave Technology*, vol. 17, No. 6, Jun. 1999, pp. 1056–1065.
A. Sharaiha et al., "All–Optical Logic NOR Gate Using a Semiconductor Laser Amplifier", *Electronics Letters*, vol. 33, No. 4, Feb. 23, 1997, pp. 323–325.
B. Schneier: "Applied Cryptography Second Edition: protocols, algorithms, and source code in C", John Wiley & Sons, Inc., NY. , pp. 13–15, 1996,.
J. Leuthold, et al.: "All–Optical Mach–Zehnder Interferometer Wavelength Converters and Switches with Integrated Data– and Control–Signal Separation Scheme", 1999 Journal of Lightwave Technology, vol. 17, No. 6, pp. 1056–1066, Jun., 1999.
J. Leuthold, et al.: "Multimode Interference Couplers for the Conversion and Combining of Zero– and First–Order Modes", 1998 Journal of Lightwave Technology, vol. 16, No. 7, pp. 1228–1239, Jul., 1998.
J. Leuthold, et al.: "All–Optical Space Switches with Gain and Principally Ideal Extinction Ratios", IEEE Journal of Quantum Electronics, vol. 34, No. 4, pp. 622–633, Apr., 1998.

* cited by examiner

Primary Examiner—Tan V. Mai
(74) Attorney, Agent, or Firm—Ozer M. N. Teitelbaum

(57) ABSTRACT

An optical device for performing at least one Boolean logic operation. The optical device has at least a first and second input signal and at least one output signal. The optical device includes at least one interferometer for receiving the at least a first and second input signals. The device also has at least one optical amplifier for creating a phase difference between the first and second inputs to generate the output signal to perform at least one Boolean logic operation.

1 Claim, 6 Drawing Sheets

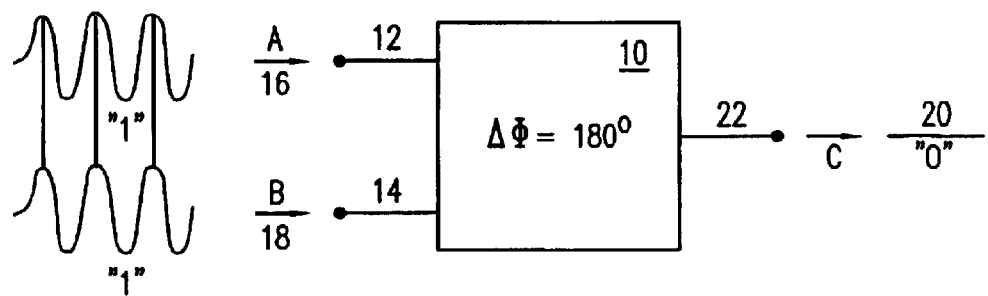
FIG. 1A
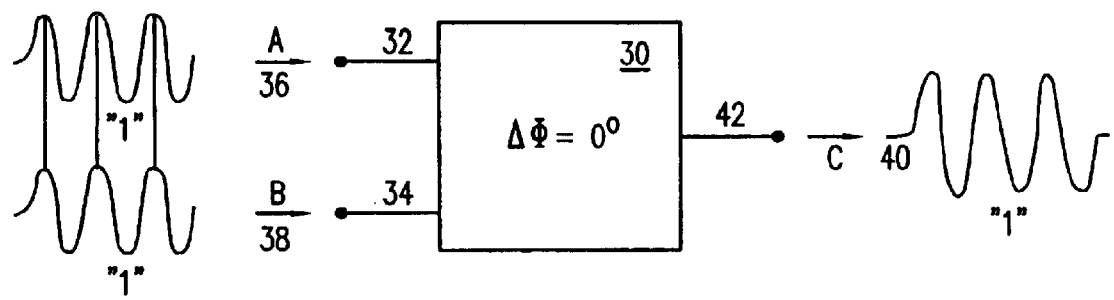
FIG. 1B
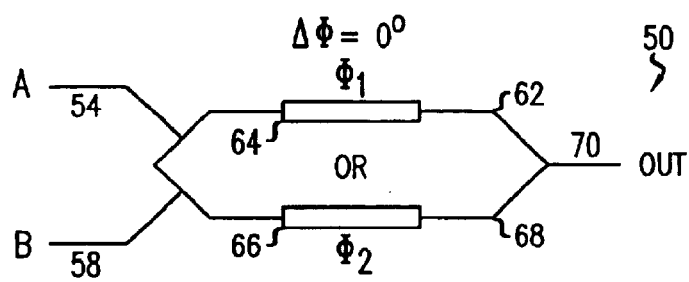
FIG. 2A
FIG. 2B
| A | B | OUT |
|---|---|---|
| 0 | 0 | 0 |
| 0 | 1 | 1 |
| 1 | 0 | 1 |
| 1 | 1 | 1 |

FIG. 3A
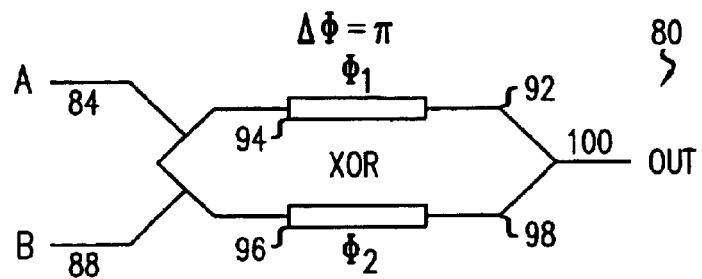
FIG. 3B
| A | B | OUT |
|---|---|-----|
| 0 | 0 | 0 |
| 0 | 1 | 1 |
| 1 | 0 | 1 |
| 1 | 1 | 0 |
FIG. 4A
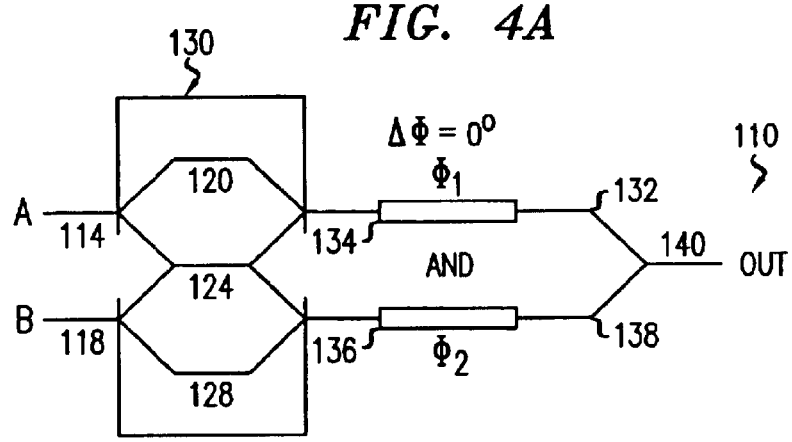
FIG. 4B
| A | B | OUT |
|---|---|-----|
| 0 | 0 | 0 |
| 0 | 1 | 0 |
| 1 | 0 | 0 |
| 1 | 1 | 1 |

FIG. 5A
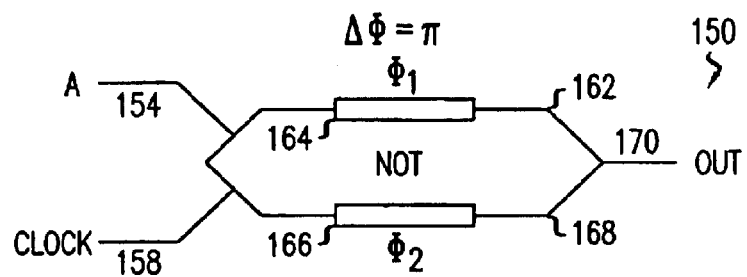
FIG. 5B
| A | OUT |
|---|-----|
| 0 | 1   |
| 1 | 0   |
FIG. 6A
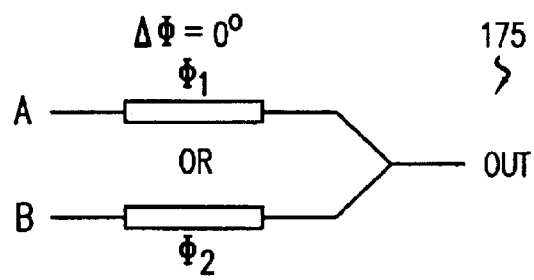
FIG. 6B
| A | B | OUT |
|---|---|-----|
| 0 | 0 | 0   |
| 0 | 1 | 1   |
| 1 | 0 | 1   |
| 1 | 1 | 1   |

| A | B | SUM | CARRY |
|---|---|-----|-------|
| 0 | 0 | 0   | 0     |
| 0 | 1 | 1   | 0     |
| 1 | 0 | 1   | 0     |
| 1 | 1 | 0   | 1     |

| A | B | C | SUM | CARRY |
|---|---|---|-----|-------|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

OPTICAL BOOLEAN LOGIC DEVICES FOR DATA ENCRYPTION

FIELD OF THE INVENTION

The present invention relates to optics, generally, and more particularly to a computing system employing optical elements.

BACKGROUND OF THE INVENTION

Considerable research has been expended on the development of network systems offering greater bandwidth with increased rates of data transmission. Presently, optical network systems operating with greater than eighty (80) wavelength channels and transmission speeds well over ten (10) gigabits per second are commercially available. A laboratory experiment, however, has recently demonstrated transmission speeds of one hundred (100) gigabits per second. For more information, see Mikkleson et al., "Unrepeatered Transmission over 150 km of Nonzero-Dispersion Fiber at 100 Gbit/s with Semiconductor Based Pulse Source, Demultiplexer and Clock Recovery," *Electronic Letters*, Vol. 35, No. 21 (Oct. 1999), hereby incorporated by reference.

With this rise in transmission speeds and bandwidth capacity, there has also been an increasing load on networks. The load on networks is attributable to a growing number of users seeking network access. The load also relates to an expanding number of applications for such user access. These applications include, for example, e-business activity, corporate websites, as well as intranet and internet access.

The growing demand on networks has also raised concerns regarding data security. Data security entails the use of cryptography. Cryptography may be defined as the science of preventing eavesdroppers from understanding the meaning of intercepted information. For more information, see Schneier, Applied Cryptography, Second Edition, Wiley & Sons 1996 (hereinafter "Schneier"), and Koopman, Jr., U.S. Pat. No. 5,696,828 (hereinafter "Koopman"), both of which are hereby incorporated by reference. A cryptographically secure one way transmission of a message includes two primary process steps: 1) encrypting the message using a security key to hide the meaning of the message from eavesdroppers; and 2) decrypting the encrypted message using the security key so the intended user may understand the message.

Presently, the encrypting and decrypting steps are performed while the message and the encrypted message are in electrical form. This is particularly time consuming if the original message is a set of optical signals and conversion to an electrical representation is required. For more information, see Rutledge, U.S. Pat. No. 5,864,625, hereby incorporated by reference. It should be noted that for the purposes of the present disclosure, a message in the form of optical or electrical data is a digital signal employing a binary scheme, as is known in the art. See Hill and Richardson, Introduction to Switching Theory and Logical Design, Third Edition, Wiley & Sons 1981, (hereinafter "Hill"), pp. 1–21, hereby incorporated by reference. In such circumstances, an optical signal is first converted to an electrical representation, and then encrypted using any variety of techniques known in the art. For examples, see Koopman and Schneier. Thereafter, the encrypted electrical representation is transformed back into an optical format by modulating an optical beam using the encrypted electrical representation, and transmitted to the intended user. The intended user reconverts the received optically formatted signal back into an electrical format. In electrical form, the received signal is then decrypted and may be transformed once again into an optical signal for subsequent processing by the user's network.

Moreover, the computationally intensive process steps of encrypting and decrypting the data are traditionally performed by semiconductor based Boolean logic circuits. As the demands on networks rise along with transmission speeds and bandwidth capacity, the switching and processing limitations of semiconductor devices will eventually create a bottleneck in providing data security. It is conceivable that in the not so distant future, semiconductors—comparably faster than present day devices—may bog down prospective optically based networks for a host of reasons, including security issues. This is based on the historical increases in processing power and switching speeds of semiconductors and the rising bandwidth capacity in optical networks.

Investigative efforts therefore have begun to focus on functional alternatives to semiconductors offering switching and processing times more compatible with network transmission speeds. Research has been aimed at utilizing electro-optics and optical devices to perform various computational Functions. For more information, see Avramopolous et al., U.S. Pat. No. 5,208,705, which is hereby incorporated by reference. These computational functions being explored include combinatorial Boolean logic operations necessary for encrypting and decrypting the data. Boolean logic operations include, but are not limited to, AND, OR, NOT, NAND, NOR, eXclusive-OR (XOR), as well as eXclusive-NOR (X-NOR) functions. See Hill, pp. 22–137, hereby incorporated by reference.

Optical devices for performing logic operations are known. For more information, see Islam, U.S. Pat. No. 4,932,739, and Hansen, U.S. Pat. No. 5,353,114, both of which are commonly assigned with the present invention, as well as Riseberg et al., U.S. Pat. No. 3,984,785 and Jensen, U.S. Pat. No. 4,632,518, all of which are hereby incorporated by reference. However, improvements to optical devices for performing logic operations are still needed.

As such, a demand exists for an optical device to perform computational functions, such as, combinatorial Boolean logic operations, for example. There also exists a demand for an optical device for encrypting and decrypting data.

SUMMARY OF THE INVENTION

An optical device for performing at least one computational function is disclosed. In a first embodiment of the present invention, an optical logic device is described which receives typically a first and a second optical input signal. An optical output signal is generated by the device in response to the Boolean operation performed on the optical input signals. The optical logic device may execute various Boolean operations, including AND, OR, and XOR, as well as NOT, NAND, NOR and X-NOR functions. The optical logic device realizes these and other features by including a pair of waveguides and a phase delay element for creating interference.

In one embodiment, the optical logic device incorporates an interferometer, such as a Mach-Zehnder interferometer ("MZI") or Michelson interferometer ("MI"). The interferometric device consists of a three port configuration for receiving at least a first and a second input, and for generating an output. The interferometer has at least a first and a second waveguide for respectively receiving the first and second optical input signals. The first and a second waveguide adjoin at an output where the optical output signal is generated. Each waveguide has at least one amplifier, such as a semiconductor optical amplifier ("SOA"), integrated therein. Advantageously, the amplifier may be monolithically integrated within each respective waveguide on a single substrate. The amplifiers within each waveguide are configured to create a relative phase difference between the waveguides at the output. The selected relative phase difference corresponds with the Boolean operation of the optical logic device.

In one example, the optical logic device has a relative phase difference of one hundred eighty (180°) degrees to support an XOR Boolean operation. The truth table reflecting the operation of an XOR Boolean operation is shown in FIG. 3(b). If the first and second input optical signals both represent a binary one, the optical logic device creates an output optical signal representative of a binary zero. A binary zero output is generated here because the relative phase initiates destructive interference, as shown in FIG. 1(a). If both input optical signals represent a binary one, one of the input optical signals is phase shifted by 180° relative to the other input optical signal. The phase shifted input optical signal is then combined with the other input optical signal at the output to destructively interfere with each other. In so doing, an output optical signal is created representative of a binary zero. If both input optical signals represent a binary zero, no light travels through either waveguide, resulting in an output optical signal representative of a binary zero. However, if only one of input optical signals represents a binary one, and the other input optical signal reflects a binary zero, an output optical signal is created representative of a binary one. In this circumstance, optical power reflective of the binary one propagates through one waveguide, while the other waveguide does not receive optical power. At the output of the interferometer, the optical power representing a binary one is combined with the optical signal reflects a binary zero to derive the output optical signal equivalent to a binary one.

These and other embodiments, advantages and objects will become apparent to skilled artisans from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below:

FIGS. 1(a) and 1(b) illustrate constructive and destructive interference as employed in the present invention;

FIGS. 2(a) and 2(b) illustrate a top view of an embodiment of the present invention;

FIGS. 3(a) and 3(b) illustrate a top view of another second embodiment of the present invention;

FIGS. 4(a) and 4(b) illustrate a top view of another embodiment of the present invention;

FIGS. 5(a) and 5(b) illustrate a top view of another embodiment of the present invention;

FIGS. 6(a) and 6(b) illustrate a top view of another embodiment of the present invention;

Figures 7A, 7B:
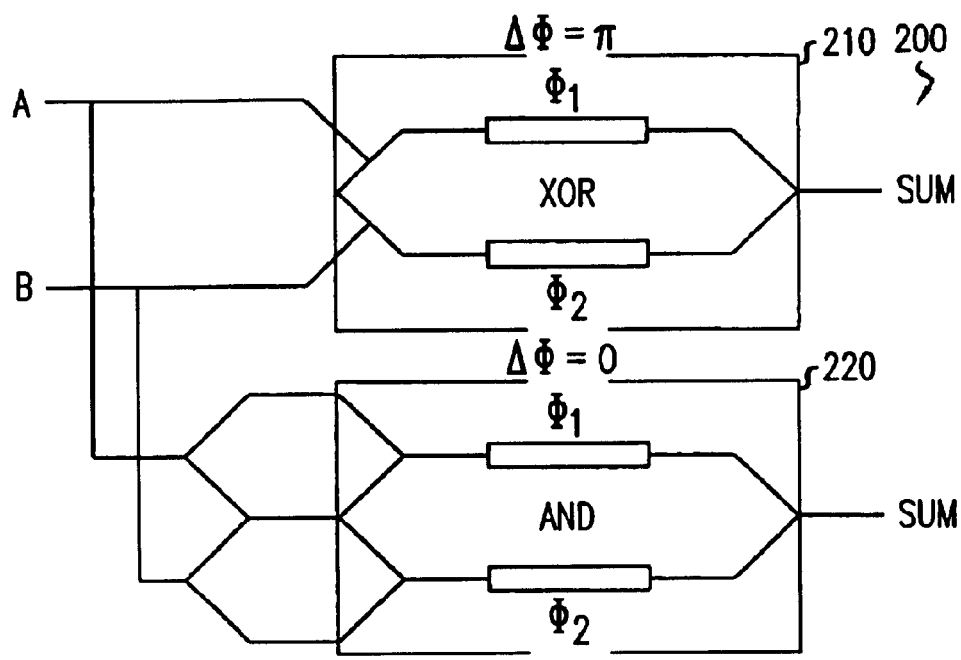
FIG. 7(a) and 7(b) illustrate a top view of another embodiment of the present invention.

It should be emphasized that the drawings of the instant application are not to scale but are merely schematic representations, and thus are not intended to portray the specific parameters or the structural details of the invention, which can be determined by skilled artisans by examination of the information herein.

DETAILED DESCRIPTION OF THE PRESENT INVENTION

The present invention utilizes the principles of interference to realize various computational functions. These computational functions include Boolean operations such as AND, OR, XOR, NOT, NAND, NOR and X-NOR. The invention may be realized by a pair of waveguides in combination with a phase delay element, or in the alternative, an interferometric device. By this arrangement, the principles of constructive and destructive interference may be employed, as illustrated in FIGS. 1(a) and 1(b). For the purposes of the present invention, an interferometric device includes a Mach-Zehnder interferometer ("MZI") and a Michelson interferometer ("MI"), for example, though various substitutes will become apparent to skilled artisans upon reviewing the disclosure herein.

Referring to FIG. 1(a), a first three port interferometric device 10 is shown. Device 10 has a first and a second input, 12 and 14, for receiving a first (A) and a second (B) input optical signal, 16 and 18, respectively. In the illustrated example, A and B both correspond with a binary one. Device 10 phase shifts one input optical signal with respect to the other input optical signal by a relative phase difference, $\Delta\Phi$, of one hundred eighty (180°) degrees. In so doing, the peak of the phase shifted input optical signal is aligned with the trough of the other input optical signal. When both optical input signals are combined by device 10 at output 22, destructive interference is created. As a result, output (C) optical signal 20 is reflective of a binary zero.

Referring to FIG. 1(b), a second three port interferometric device 30 is shown having a relative phase difference, $\Delta\Phi$, of zero (0°) degrees. Device 30 has a first and a second input, 32 and 34, for receiving a first (A) and a second (B) input optical signal, 36 and 38, respectively. In the illustrated example, A and B both correspond with a binary one. Device 30 phase shifts one input optical signal with respect to the other input optical signal by the relative phase difference, $\Delta\Phi$, of zero (0°) degrees. In so doing, the peak of the phase shifted input optical signal is aligned with the peak of the other input optical signal. Thus, when both optical input signals are combined by device 30, constructive interference causes an output (C) optical signal 40 at output 42 of a binary one.

It should be noted that for different binary values of input optical signals, A and B, a different output optical signal C may be produced. This depends on the Boolean operation intended for the three port interferometric device. The causal relationship between the input optical signals, A and B, and the output optical signal, C, will become apparent from the disclosure hereinbelow.

For the purposes of the present invention, an optical signal described as a binary one reflects the characteristics of signal 16, for example. In one embodiment of the present invention, the optical signal is characterized by a wavelength of approximately 1550 nm, and comprises binary values of ones and zeros distinguishable by a power separation of at least 10 db. Threshold power values for a binary zero and a binary one are selected in accordance with various additional components (not shown), such as a photodetector, coupled with the present invention. It should be noted also, for the purposes of the present invention, binary input signals are received in phase with respect to each other. Alternative ranges and parameters, however, will become apparent to skilled artisans upon reviewing the disclosure herein.

Referring to FIGS. 2(a) and 2(b), an optical logic device 50 for performing a Boolean OR operation is shown according to an embodiment of the present invention. Optical logic device 50 includes at least a first and a second input, 54 and 58, for receiving at least a first and a second input optical signal, A and B. Device 50 includes at least one waveguide. In one embodiment, device 50 is formed from an MZI having a first and a second waveguide, 62 and 68, for respectively receiving optical signals, A and B, through inputs, 54 and 58.

Device 50 also includes an amplifier. In one embodiment, the amplifier is realized by a first and a second semiconductor optical amplifier ("SOA"), 64 and 66. Each SOA is biased to operate in the saturation region. For the purposes of the present invention, each SOA amplifies a received optical signal while also induces a phase change. As is known to skilled artisans, the phase change is controllable and results primarily from the ratio of the refractive index of the waveguide to the amplification gain over the SOA length. For more information, see Leuthold et al., "All-Optical Space Switches with Gain and Principally Ideal Extinction Ratios," IEEE Journal of Quantum Electronics, Vol. 34, No. 4 (Apr. 1998) (hereinafter "Leuthold I"), and Leuthold et al., "All-Optical Mach-Zehnder Interferometer Wavelength Converters and Switches with Integrated Data and Control Signal Separation Scheme," Journal of Lightwave Technology, Vol. 17, No. 6 (Jun. 1999) (hereinafter "Leuthold II"), hereby incorporated by reference.

As shown, SOA 64 corresponds with waveguide 62, and SOA 66 corresponds with waveguide 68. Each SOA creates a phase delay, $\Phi_1$ and $\Phi_2$, with respect to optical power propagating through its corresponding waveguide. As such, input optical signal, A, propagates through waveguide 62 having a phase delay $\Phi_1$, while input optical signal, B, propagates through waveguide 68 having a phase delay $\Phi_2$. Optical signals A and B are combined at an output junction 70, where waveguides, 62 and 68, are adjoined. A relative phase delay, $\Delta\Phi$, of zero (0°) degrees is created between waveguides, 62 and 68, at output junction 70. Thus, when optical power from both waveguides is present at output junction 70, it is in phase and constructive interference will occur. The combination of optical signals A and B creates an output signal OUT.

Device 50 performs a Boolean OR logic operation on binary input signals A and B. The relationship between signals A, B, and OUT is reflected in the truth table shown in FIG. 2(b). Functionally, when signals A and B are both binary zeros, a null signal equivalent to a binary zero propagates through both waveguides. At output junction 70, both null signals are combined to generate a null output optical signal OUT corresponding with a binary zero.

If only one input signal A or B is a null signal, while the other input signal is a binary one, output optical signal OUT is equivalent to a binary one. Here, the optical power associated with the binary one input optical signal is combined with the null signal of the other input optical signal at output junction 70. This combination results in an output signal OUT equivalent to a binary one.

In the event both input optical signals A and B are binary ones, optical power from each input signal propagates through both waveguides with a corresponding phase delay. As the relative phase relative, $\Delta\Phi$, between each waveguide is zero (0°) degrees, both input optical signals A and B are in phase at output junction 70. Therefore, when the optical power associated with both input optical signals is combined, constructive interference creates an output signal OUT equivalent to a binary one. This scenario is illustrated in FIG. 1(b) and the accompanying text herein.

Referring to FIGS. 3(a) and 3(b), an optical logic device 80 for performing an XOR Boolean operation is shown according to an embodiment of the present invention. Optical logic device 80 includes at least a first and a second input, 84 and 88, for receiving at least a first and a second input optical signal, A and B. Device 80 includes at least one waveguide. In one embodiment, device 80 has a first and a second waveguide, 92 and 98, for respectively receiving optical signals, A and B, through inputs, 84 and 88.

Device 80 also includes an amplifier. In one embodiment, the amplifier is realized by a first and a second semiconductor optical amplifier ("SOA"), 94 and 96. By this arrangement, SOA 94 corresponds with waveguide 92 and SOA 96 corresponds with waveguide 98. Each SOA creates a phase delay, $\Phi_1$ and $\Phi_2$, with respect to its corresponding waveguide. As such, input optical signal, A, propagates through waveguide 92 having a phase delay $\Phi_1$, while input optical signal, B, propagates through waveguide 98 having a phase delay $\Phi_2$. Optical signals A and B are combined at an output junction 100, where waveguides, 62 and 68, are adjoined. By this design, a relative phase delay, $\Delta\Phi$, of one hundred eighty (180°) degrees is created between waveguides, 92 and 98, at output junction 100. Thus, when optical power from both waveguides is present at output junction 100, it is out of phase and destructive interference will occur. The combination of optical signals A and B creates an output signal OUT.

Device 80 performs a Boolean XOR logic function on binary input signals A and B. The relationship between signals A, B, and OUT is reflected in the truth table shown in FIG. 3(b). Functionally, when signals A and B are both binary zeros, a null signal equivalent to a binary zero propagates through both waveguides. At output junction 100, both null signals are combined to generate a null output optical signal OUT corresponding with a binary zero.

If only one input signal A or B is a null signal, while the other input signal is a binary one, output optical signal OUT is equivalent to a binary one. Here, the optical power associated with the binary one input optical signal equal is combined with the null signal of the other input optical signal at output junction 100. This combination results in an output signal OUT equivalent to a binary one.

In the event both input optical signals A and B are binary ones, optical power from each input signal propagates through both waveguides with a corresponding phase delay. As the relative phase relative, $\Delta\Phi$, between each waveguide is one hundred eighty (180°) degrees, both input optical signals A and B are out of phase with respect to each other at output junction 70. Therefore, when the optical power associated with both input optical signals is combined, destructive interference creates an output signal OUT equivalent to a binary zero. This scenario is illustrated in FIG. 1(a) and the accompanying text herein.

Referring to FIGS. 4(a) and 4(b), an optical logic device 110 for performing an AND Boolean operation is shown according to an embodiment of the present invention. Optical logic device 110 includes at least a first and a second input, 114 and 118, for receiving at least a first and a second input optical signal, A and B, respectively. Device 110 includes at least one waveguide. In one embodiment, device 110 has a first and a second waveguide, 132 and 138.

Device 110 also includes an amplifier. In one embodiment, the amplifier is realized by a first and a second semiconductor optical amplifier ("SOA"), 134 and 136. By this arrangement, SOA 134 corresponds with waveguide 132 and SOA 138 corresponds with waveguide 138. Each SOA creates a phase delay, $\Phi_1$ and $\Phi_2$, with respect to its corresponding waveguide. As such, the optical signal propagating through waveguide 132 has a phase delay, $\Phi_1$, while the optical signal propagating through waveguide 138 has a phase delay, $\Phi_2$. Optical signals A and B are combined at an output junction 140, where waveguides, 132 and 138, are adjoined. By this design, a relative phase delay, $\Delta\Phi$, of zero (0°) degrees is created between waveguides, 132 and 138, at an output junction 140. Optical signals A and B are combined at an output junction 140 to form an output signal OUT, where waveguides, 132 and 138, are adjoined. Device 110 employs constructive or destructive interference at output junction 140, depending on the binary values of the optical signals, as will be understood from disclosure hereinbelow.

First and second inputs, 114 and 118, are coupled with waveguides, 132 and 138, through a power divider 130. Power divider 130 allocates a portion of each input signal, 114 and 118, into each waveguide, 132 and 138. Power divider 130 includes a Y-junction device 142 and branches 120, 124, and 128. Y-junction devices are known to skilled artisans. For more information, see Leuthold et al., "Multimode Interference Couples for the Conversion and Combining of Zero and First Order Modes," Journal of Lightwave Technology, Vol. 16, No. 7 (Jul. 1998) (hereinafter "Leuthold III"), hereby incorporated by reference. Y-junction device 142 includes a multimode interference ("MMI") coupler having a single input port and at least two output ports. MMI couplers are waveguide couplers for converting a fundamental mode of optical power into a first order mode. MMI couplers couple the first order mode with one or more output waveguides, depending on the geometry of the MMI coupler. Operably, an input arm of the MMI coupler is positioned such that the output waveguide(s) are in contact with each other to form a wider waveguide for transmitting two optical beams in the form of a first mode. Here, the MMI of Y-junction 142 is configured to guide both a fundamental mode and a first order mode of optical power. This is realized by widening and positioning the output of Y-junction 142 to capture the desired fraction of optical power. See Leuthold III.

In one embodiment, power divider 130 allocates optical power by thirds. Thus, if only input optical signal A corresponds with a binary one, power divider 130 causes two-thirds (⅔) of the optical power associated with input optical signal A to propagate through waveguide 132, and one-third (⅓) to propagate through waveguide 138. Likewise, if only input optical signal B corresponds with a binary one, two-thirds (⅔) of the optical power, for example, propagates through waveguide 138, while one-thirds (⅓) propagates through waveguide 132. To realize this distribution of optical power, Y-junction 142 has a length measured from the inputs to the outputs of the MMI coupler. In one embodiment, Y-junction 142 has an end to end length in the approximate range of 0.5 mm to 1.0 mm corresponding with the desired coupling fraction. Moreover, it should be apparent to skilled artisans that when both input optical signals A and B correspond with a binary one, an equal amount of the optical power is distributed to waveguides 132 and 138 by power divider 130.

Device 110 performs a Boolean AND logic function on binary input signals A and B. The relationship between signals A, B, and OUT is reflected in the truth table shown in FIG. 4(b). Functionally, when signals A and B are both binary zeros, null signals propagate from inputs 114 and 118 through waveguides 132 and 138. At output junction 140, both null signals from waveguides 132 and 138 are combined to generate a null output optical signal OUT set to a binary zero.

If only one input signal, A or B, is a null signal while the other input signal, B or A, is a binary one, output signal OUT is set to a binary zero. The optical power from the binary one input signal is divided by the power divider 130, as detailed hereinabove. The distribution of optical power along waveguides 132 and 138 induces an additional relative phase shift of one hundred eighty (180°) degrees. This additional relative phase shift is created by the respective SOA of the waveguide receiving one-third (⅓) of the optical power associated with the binary one input signal. See generally Leuthold I and Leuthold II. In one embodiment, each SOA is configured to trigger the additional relative phase shift (180°) in response to receiving optical power of approximately 1 mW. This optical power corresponds with the distribution of one-third (⅓) of the optical power from a binary one input signal. The distribution between waveguides 132 and 138 of the optical power from the one input signal set to a binary one causes destructive interference at output junction 140. The resultant destructive interference, given the power differences propagating through waveguides 132 and 138, will form residue power corresponding with a binary zero. As a result, an output signal OUT created at output junction 140 is equivalent to a binary zero.

In the event both input optical signals A and B are binary ones, optical power from each input signal equally propagates through waveguides 132 and 138. With the relative phase shift, $\Delta\Phi$, between the waveguides being zero (0°) degrees, both input optical signals A and B are in phase with respect to each other at output junction 140. Moreover, waveguides 132 and 138 are balanced such that the optical power propagating through both is being equal. As such, an additional relative phase shift is not induced. Therefore, the optical power associated with both input optical signals is combined using the principles of interference to create an output signal OUT equivalent to a binary zero.

Referring to FIGS. 5(a) and 5(b), an optical logic device or inverter 150 for performing a NOT Boolean operation is shown according to an embodiment of the present invention. Optical logic device 150 includes at least a first input 154 for receiving at least a first input optical signal A. Device 150 also receives a control optical signal CLOCK at a second input 158. Control signal CLOCK is a stream of optical bits corresponding with a binary one. Moreover, the stream of optical bits is set to the maximum computational bit rate of optical logic devices employing the present invention, as stated hereinabove.

Optical logic device 150 includes at least one waveguide. In one embodiment, device 150 has a first and a second waveguide, 162 and 168. First and a second waveguides, 162 and 168, respectively receive optical signals, A and CLOCK, through inputs, 154 and 158. Device 150 also has an amplifier. In one embodiment, the amplifier is realized by a first and a second semiconductor optical amplifier ("SOA"), 164 and 166. By this arrangement, SOA 164 corresponds with waveguide 162 and SOA 166 corresponds with waveguide 168. Each SOA creates a phase delay, $\Phi_1$ and $\Phi_2$, with respect to its corresponding waveguide. As such, input optical signal, A, propagates within waveguide 162 having a phase delay $\Phi_1$, while control optical signal, CLOCK, propagates within waveguide 168 having a phase delay $\Phi_2$. Optical signals A and CLOCK are combined at an output junction 170, where waveguides, 162 and 168, are adjoined. By this design, a relative phase delay, $\Delta\Phi$, of one hundred eighty (180°) degrees is created between waveguides, 162 and 168, at output junction 170. If optical power from both waveguides is present at output junction 170, it is out of phase and destructive interference will occur. The combination of input optical signal, A, in the presence of control signal, CLOCK, creates an output signal OUT.

Device 150 performs a Boolean NOT logic function on binary input signal A. The relationship between input signal A and output signal OUT is reflected in the truth table shown in FIG. 5(b). If input signal A is a binary zero, output optical signal OUT is equivalent to a binary one. Here, the null signal equivalent to a binary zero propagates through waveguide 162, while the stream of binary ones from control signal, CLOCK, propagate through waveguide 168. At output junction 170, the combination of the binary zero null signal with the binary one of control signal, CLOCK, results in an output optical signal OUT equivalent to a binary one.

In the event input optical signal A is a binary one, optical power from signals A and CLOCK propagate through waveguides 162 and 168. As the relative phase, $\Delta\Phi$, between each waveguide is one hundred eighty (180°) degrees, signals A and CLOCK are out of phase with respect to each other at output junction 170. Therefore, when the optical power associated with both input optical signals is combined, destructive interference creates an output signal OUT equivalent to a binary zero.

Optical logic device 150 enables the design of various additional Boolean operations in view of the other embodiments detailed hereinabove. As such, it will become apparent to skilled artisans that a Boolean NOR operation may be realized by combining OR logic gate 50 of FIG. 2 with NOT logic device 150. Likewise, employing NOT logic device 150 with XOR logic device 80 of FIG. 3 enables an X-NOR logic device. Combining the AND logic device 110 of FIG. 4 with the NOT logic operation of device 150 yields a NAND logic function.

Referring to FIGS. 6(a) and 6(b), an optical logic device 175 for performing a Boolean OR operation is shown according to another embodiment of the present invention. Device 175, in contrast to the optical logic device 50 of FIG. 2(a), relies on a Michelson interferometric configuration for performing a Boolean OR logic function. Operatively, device 175 functions in a similar manner to optical logic device 50. Other arrangements and alternative interferometric schemes will become apparent to skilled artisans upon reviewing the disclosure herein.

Referring to FIGS. 7(a) and 7(b), an optical two-bit binary adder 200 is shown according to another embodiment of the present invention. Two-bit binary adders are generally known. See Hill, pp. 175–182. Binary adder 200 includes an optical device 210 for performing a Boolean XOR operation, and an optical device 220 for performing a Boolean AND operation. Binary adder 200 employs Boolean logic devices detailed herein as building blocks. In one embodiment of the present invention, optical device 210 is realized by XOR gate 80 of FIG. 3, while optical device 220 is realized by AND gate 110 of FIG. 4. Adder 200 performs binary addition on binary signals A and B to create output signals SUM and CARRY. A truth table corresponding with functionality of two-bit binary adder 200 is shown in FIG. 7(b).

It should be noted that the hereinabove optical logic devices may be combined to form computational devices, such as sequential circuits, flip flops, decoders, parity checkers, shift registers, linear feedback shift registers, linear congruential generators, counters, multiplexers, demultiplexers, pseudo-random number generators, state machines, and arithmetic logic units, for example. For more information on these computational devices, see Buchsbaum, Encyclopedia of Integrated Circuits, Prentice-Hall 1981, hereby incorporated by reference. See also Hill and Koopman.

Figures 8A, 8B:
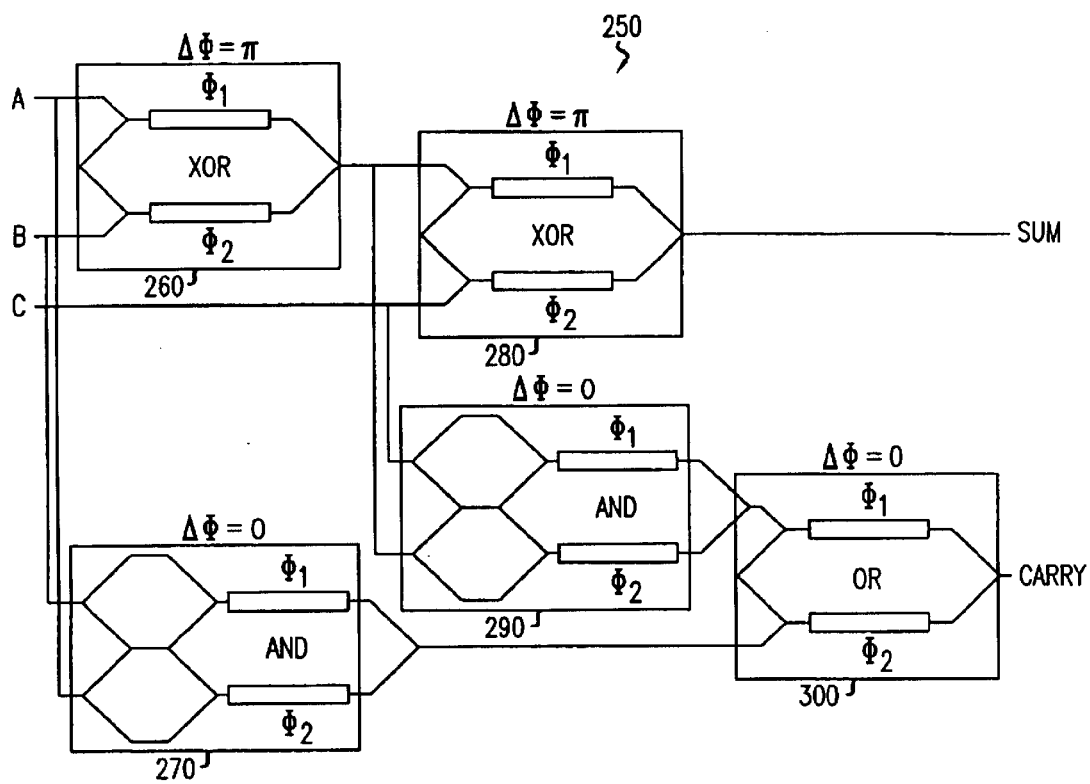
FIG. 8(a) and 8(b) illustrate a top view of another embodiment of the present invention.

Referring to FIGS. 8(a) and 8(b), an optical arithmetic device 250 is shown according to another embodiment of the present invention. Arithmetic device 250 includes optical devices 260 and 280 for performing XOR operations, optical devices 270 and 290 for performing AND operations, and an optical device 300 for performing an OR operation. Arithmetic device 250 is realized by a combination of Boolean logic devices detailed herein as building blocks. In one embodiment, optical devices 260 and 280 are realized from device 80 of FIG. 3, optical devices 270 and 290 are realized from optical device 110 of FIG. 4, and optical device 300 is realized from optical device 50 of FIG. 2.

As configured in FIG. 8(a), arithmetic device 250 is designed to function as a full three-bit adder. Full three-bit adders are a fundamental element in computational processing, and are generally known. See Hill, pp. 175–182. Arithmetic device 250 performs binary addition on binary signals A, B, and C, to create output signals SUM and CARRY. A truth table corresponding with functionality of three-bit binary adder 250 is shown in FIG. 8(b). Arithmetic device 250 may also be configured to perform other mathematical processes, including subtraction, multiplication, division, as well as trigonometric operations on any number of bits.

Figure 9:
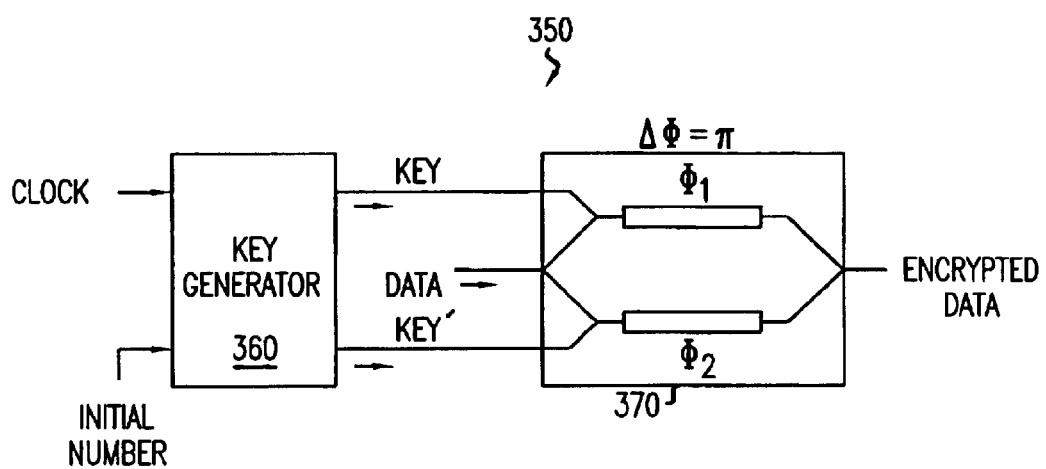
FIG. 9 illustrates a top view of another embodiment of the present invention.

Referring to FIG. 9, an optical device 350 for encrypting data is shown according to another embodiment of the present invention. Encryption device 350 is realized by an optical key generator 360 and an optical encryptor 370. Key generator 360 is a number generator used in cryptographically securing the one way transmission of data as detailed hereinabove. See Schneier and Koopman. Generator 360 may be realized using various configurations known to skilled artisans, such as a linear feedback shift register ("LFSR"), for example. In one embodiment, optical key generator 360 comprises a number of optical logic devices as building blocks for generating an optical key. The optical logic devices forming generator 360 may be realized from the embodiments of the present invention detailed hereinabove.

Generator 360 creates an output KEY in response to receiving a trigger or clock signal, CLOCK, and an initial number, INITIAL NUMBER, as is known to skilled artisans. See Schneier and Koopman. Optical encryptor 370 receives the optical KEY signal of key generator 360 and a stream of data signals, DATA. In response, encryptor 370 generates an ENCRYPTED DATA output. In a further embodiment, optical encryptor 370 also receives an optical signal KEY' from key generator 360. Optical signal KEY' is a phase delayed version of optical signal KEY. The relative phase delay between optical signal KEY and optical signal KEY' corresponds with the bit width of the data from the optical stream of data signals, DATA.

Upon receiving bits from the optical stream of data signals, DATA, and optical signal KEY, encryptor 370 performs an encryption operation similar to bit flipping. Here, optical signal KEY' acts as reset mechanism for resetting encryptor 370. The optical power of signal KEY is set to initiate an additional phase shift of one hundred eighty (180°) degrees to the relative phase relative, ΔΦ, between each waveguide. As such, if a binary one bit from optical signal KEY is received, the additional phase delay creates an effective phase delay of zero (0°) degrees at the output junction.

In the above scenario, the optical stream of data signals, DATA, split equally between both waveguides of the encryptor 370, are constructively added at the output junction. However, optical signal KEY' is set to initiate an additional phase shift of one hundred eighty (180°) degrees. Thus, upon receiving optical signal KEY', destructive interference is created at the output junction, causing the optical stream of data signals, DATA.

Figure 10:
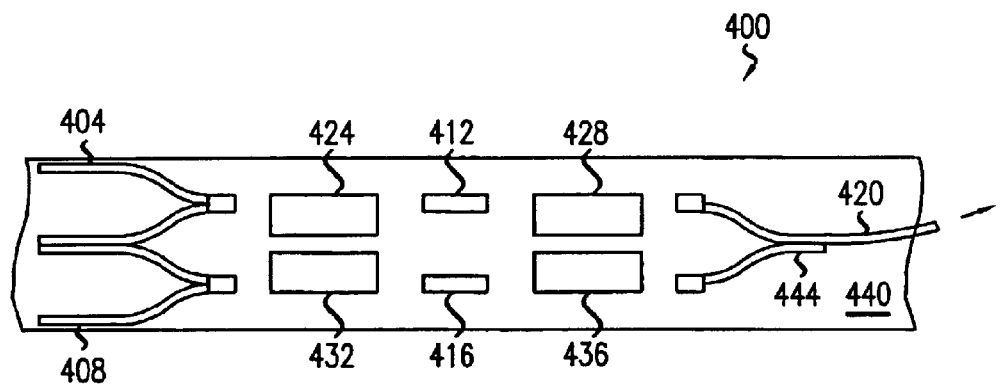
FIG. 10 illustrates an example of a three port interferometer as employed in the present invention.

Referring to FIG. 10, a three port interferometer based, Boolean logic device 400 is shown according to another embodiment of the present invention. Device 400 is approximately 5 mm long, from the input ports to the output ports of the interferometer. Device 400 employed a first and a second waveguide, 412 and 416. Waveguides, 412 and 416, are approximately 0.4 mm long, from the output of a first SOA, 424 or 432, to the input of a second SOA, 428 or 436, respectively. Waveguides, 412 and 416, each received an input optical signal at the inputs 404 and 408, respectively.

Waveguides, 412 and 416, are formed on a single substrate 440 of indium phosphide (InP). Each of the SOAs is monolithically integrated within their respective waveguides. The SOAs were formed from $In_{1-x}Ga_xAs_yP_{1-y}$, where x=0.4 and y=0.85, sandwiched between an n-doped and p-doped cladding layers of indium and phosphorus (InP). The p doping levels were approximately $2\times10^{17}$, while the n doping levels were approximately $2\times10^{18}$. Mesas were formed to define active regions of the SOA.

In one embodiment, the device of the present invention is formed by two splitters—MMI couplers—for dividing and combining the optical data signals, two couplers—MMI couplers—for introducing the control signals, and the SOAs for providing the necessary nonlinearity for switching. The SOAs may be placed on the MZI arms to ease control of the on-off states. The SOAs are grown by a two-step Metal Organic Vapor Phase Epitaxy process on the InP substrate. Initially, 1.55 um-InGaAsP active SOA layers approximately 0.22 μm thick are grown. Subsequently the region outside the 500–1500 μm long SOA areas are etched, and the passive waveguide layer is grown—first a 0.6 μm thick 1.28 μm—InGaAsP layer, and a 1.6 μm thick InP cladding layer thereafter. The waveguides are then formed by etching into the SOA and waveguide heterostructure. The 2×2-MMI structures are advantageously etched during the formation of the waveguides and are 200 μm by 11.3 μm. A heavily doped InGaAs layer is then placed on top of the waveguide sections to provide contacts with gold pads. The resultant chip size of the device is approximately 6×1.0 mm. It should be noted that the waveguide facets are antireflection coated, while the chip is thinned to allow heat dissipation and ease of cleaving.

Waveguides 412 and 416 each include a pair of SOAs, 424/428 and 432/436. Each SOA had a length approximately in the range of 600 μm to 1200 μm. Moreover, each SOA consumed approximately 300 mW of power, and had a gain of approximately 25 dB at room temperature for an optical signal operating approximately at a wavelength of 1550 nm.

Through a Y-junction coupler 438 formed from an MMI, waveguides 412 and 416 adjoin at an output junction 420. The MMI is approximately 0.5 mm long, measured from end to end, to capture the desired proportional optical power from waveguides, 412 and 416. As a result, an output signal 444 propagated through output junction 420.

As detailed hereinabove, device 400 employs constructive or destructive interference at junction 420 in formulating output signal 444. The interference created is dependent on relative phase differences created by the SOAs. The selection of the relative phase differences determines, in part, the Boolean logic operation to be performed.

Given the above arrangement, the switching speed has been observed to be approximately 10 picoseconds. This result, however, is limited by the change in carrier density in each of the SOAs following the arrival of optical power. The change in carrier density, however, is generally directly proportional to the wavelength of the optical power. In present example, the change in carrier density is minimal given the narrow operable wavelength range of the optical signals.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to skilled artisans upon reference to this description without departing from the spirit of the invention, as recited in the claims appended hereto. It is therefore contemplated that the appended claims will cover any such modifications or embodiments as fall within the true scope of the invention.

What is claimed is:

1. An optical device for encrypting data in response to receiving data and an optical key signal, the optical device comprising:

at least one interferometer having a first and a second waveguide, the first waveguide receiving the data and the optical key signal, and the second waveguide receiving the data and the optical key signal phase delayed;

at least one key generator for inducing an initial relative phase delay of 180° between the first and second waveguides, for creating a first additional relative phase delay of 180° between the waveguides in response to receiving a binary one from the optical key signal, and for creating a second additional relative phase delay of 180° between the waveguides in response to receiving a binary one from the optical key signal phase delayed; and a y-junction device for adjoining the first and second waveguides to create an output node from which encrypted data is generated.

* * * * *